United States Patent [19]

Smith et al.

[11] Patent Number: 5,161,184

[45] Date of Patent: Nov. 3, 1992

[54] RING-BACK POWERED TELEPHONE WITH NONVOLATILE MEMORY STRUCTURE

[75] Inventors: Benjamin A. Smith, Celeste; Steven W. Burnett, Richardson, both of Tex.

[73] Assignee: Digital Telecommunications Systems, Inc., Dallas, Tex.

[21] Appl. No.: 391,483

[22] Filed: Aug. 9, 1989

[51] Int. Cl.⁵ .............................................. H04M 1/00
[52] U.S. Cl. ..................... 379/413; 379/387
[58] Field of Search ............... 379/324, 373, 412, 413, 379/387

[56] References Cited

U.S. PATENT DOCUMENTS

| | | |
|---|---|---|
| 4,488,006 | 12/1984 | Essig et al. ............................ 379/413 |
| 4,636,587 | 1/1987 | Zoerner ................................. 379/387 |
| 4,691,344 | 9/1987 | Brown et al. ......................... 379/413 |
| 4,777,647 | 10/1988 | Smith et al. . |
| 4,947,422 | 8/1990 | Smith et al. . |

*Primary Examiner*—James L. Dwyer
*Assistant Examiner*—Jhancy Augustus
*Attorney, Agent, or Firm*—Richards, Medlock & Andrews

[57] ABSTRACT

A programmable telephone powered by a telephone line, and responsive to ringing signals for providing an automatic answer. A microprocessor in the telephone is powered by periodic signals during ringing intervals for executing instructions to count the number of ring cycles, and is placed in a sleep mode if such number does not exceed a predefined threshold. When the threshold number of rings occurs, the microprocessor places the telephone in a simulated off-hook condition for allowing programming of the memory thereof. The memory of the microprocessor is an EEPROM having a file allocation table with addresses pointing to an input dialing pattern table, an area code/exchange code table and to an output dialing pattern table. Multiple levels of user and software security codes are employed to provide a high degree of security to the programming of the telephone.

39 Claims, 6 Drawing Sheets

| ENTRY | ADDRESS POINTING TO: |
|---|---|
| 1 | NEXT FREE MEMORY LOCATION, AND NEXT FREE FAT ENTRY |
| 2 | USER AREA WITH MULTIPLE OPERATING PARAMETERS, FLAGS, ETC. |
| 3-28 | TWENTY SIX SPEED DIAL NUMBERS |
| 29 | NUMBER PLAN AREA/EXCHANGE CODE TABLE (NPA/NXX) |
| 30-40 | CALL STATISTIC USAGE AREAS |
| 41 | HEADER OF THE INPUT DIALING PATTERN TABLE |
| 42-85 | FREE AREA |
*FIG. 4b*
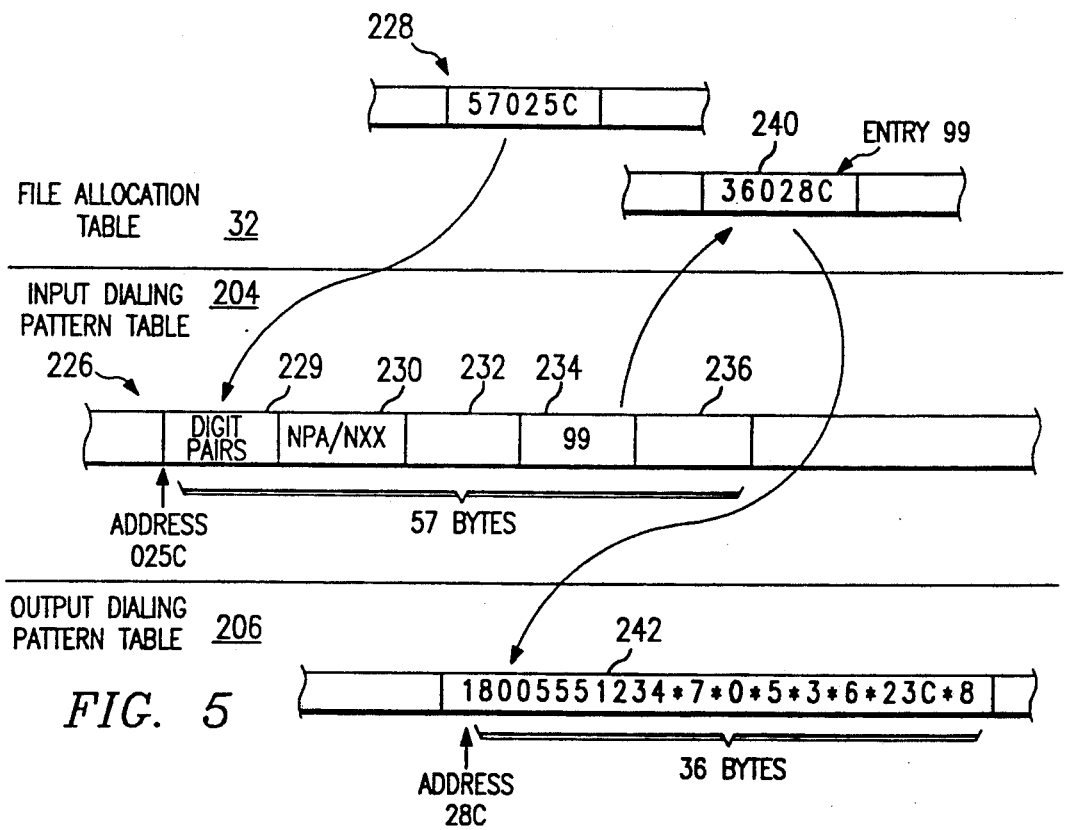
*FIG. 5*
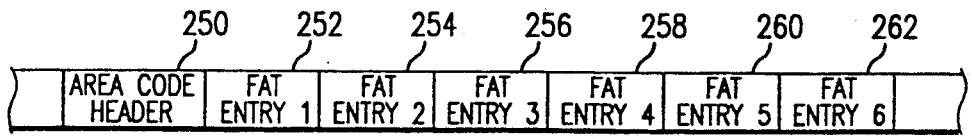
*FIG. 8*

| | |
|---|---|
| *0 | WAIT FOR PRECISION DIAL TONE UNTIL TIMEOUT |
| *1 | WAIT FOR 400Hz PROGRESS TONE UNTIL TIMEOUT |
| *2NN | SET THE TIMEOUT VALUE TO NN SECONDS |
| *3 | DIAL THE CONTENTS OF THE ANI REGISTER |
| *4NN | CALL DIALING PATTERN NN, FOR NESTED PATTERNS |
| *5 | PAUSE FOR THREE SECONDS BEFORE PROCEEDING |
| *6 | DIAL THE DIGITS FROM THE USER-DIALED NUMBER PASSED BY THE INPUT DIALING STRING |
| *7 | SWITCH DIALING MODE TO DTMF |
| *8 | ENABLE KEYPAD UNTIL TIMEOUT |
| *9 | WAIT FOR 440Hz PROGRESS TONE UNTIL TIMEOUT |

FIG. 6

| TABLE 0 | TABLE 1 | TABLE 2 | TABLE 3 |
|---|---|---|---|
| 000 | 214 | 817 • • • | 713 |
| 200 | 200 | 200 | 200* |
| • | 201* | • | • |
| • | 202 | • | • |
| 423* | • | • | • |
| • | • | • | 452 |
| • | • | • | 453* |
| • | • | 501* | • |
| • | • | 502 | • |
| • | 784* | • | • |
| • | 785 | • | • |
| • | 998 | • | • |
| 999 | 999 | 999* | 999 |

FIG. 7a

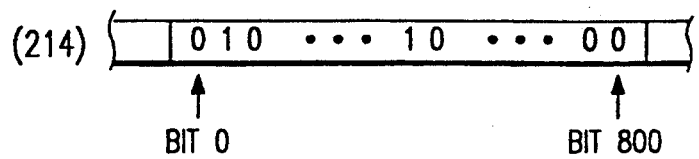

FIG. 7b

FIG. 9
| INPUT DIALING PATTERNS FILES | DIGITS WHICH CAN BE MATCHED |
|---|---|
| 01: 00 A3 | "0" PLUS A WAIT OF 3 SECONDS |
| 02: 00 00 CD | "00" PLUS ANY DIGIT UP TO 13 |
| 03: 00 11 CD | "01" PLUS ANY DIGIT UP TO 13 |
| 04: 29 11 11 | "2-9,11" |
| 05: 01 29 11 | "0-1,2-9,1" |
| 06: 29 D6 | "2-9" FOLLOWED BY ANY 6 DIGITS |
| 07: 11 29 D6 | :1,2-9" FOLLOWED BY ANY 6 DIGITS |
| 08: 11 29 01 09 29 D6 | "1,2-9,0-1,0-9,2-9" FOLLOWED BY ANY 6 DIGITS |
| 09: 00 29 D6 A3 | "0,2-9" FOLLOWED BY ANY 6 DIGITS, FOLLOWED BY A 3 SECOND WAIT |
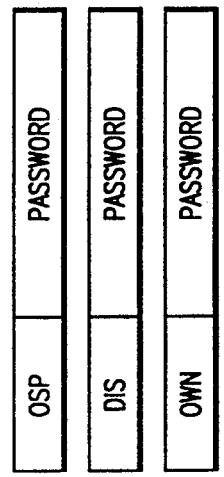
FIG. 11
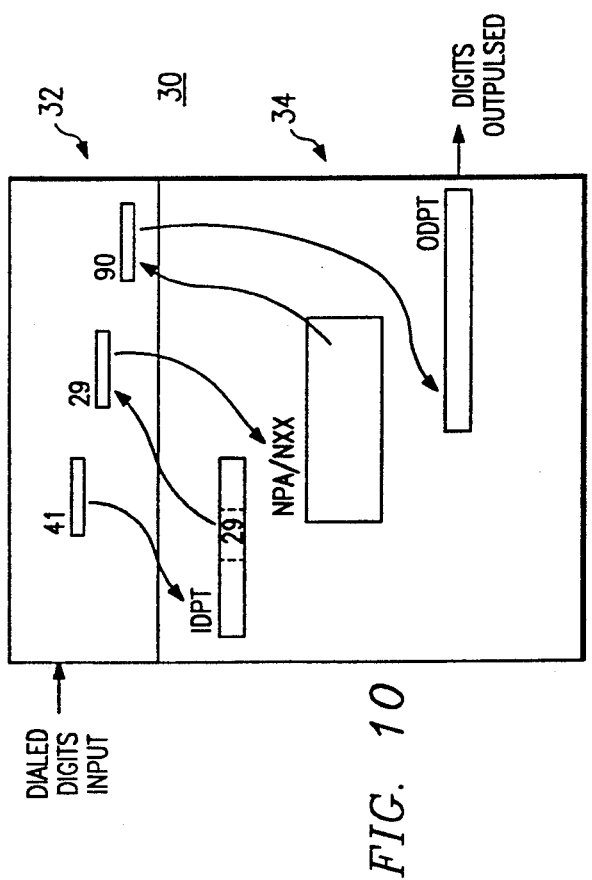
FIG. 10

RING-BACK POWERED TELEPHONE WITH NONVOLATILE MEMORY STRUCTURE

TECHNICAL FIELD OF THE INVENTION

The present invention relates in general to telephone sets, and more particularly to techniques for powering circuits of a telephone set, as well as memory structures to expedite and facilitate the completion and routing of calls.

BACKGROUND OF THE INVENTION

A new generation of telephone sets has emerged, termed "smart" telephones. Such smart telephones are highly sophisticated, including program controlled processors to automatically carry out communication functions where such functions where heretofore completed only by the intervention of a person manipulating the controls of the telephone. For example, the on-hook and off-hook functions of standard telephones are controlled by the physical placement of a handset on or off the hook switch of the telephone. In addition, in completing outgoing telephone calls, the outpulsing of digits, and especially those requiring the intervention long-distance common carriers, is automatically accomplished by repeating the digits input by the calling party, in addition to other digit strings irrespective of whether such call can be completed via a particular common carrier. Many of these functions are transparent to the user.

Standard telephones and smart telephones are typically powered by central office battery, via a tip-and-ring subscriber line. However, such battery power is not available to the circuits of the telephone set during on-hook conditions, as the hook switch then disconnects the subscriber line from the telephone circuits. This is disadvantageous in situations where circuit operations of the telephone are required during on-hook conditions. While the telephone sets could be constructed with internal battery supplies to power the circuits during on-hook situations, such an approach is not preferable, due to the cost of the batteries and recharging circuits, as well as the space required to accommodate such additional components.

In addition to the enhanced sophistication of telephones themselves, the environment in which telephones must operate has also become much more complicated. For instance, regulatory constraints impose strict territorial limitations on the various common carriers. In other words, a person is not without unlimited options in employing common carriers of choice to complete telephone calls to certain destinations. In particular, and as a result of recent impositions of territorial restrictions by the courts, local access transport areas (LATA) have been established in which specified common carriers can operate. Such LATAs are defined by arbitrary boundaries, generally not corresponding to local exchange or area code boundaries. In addition to the foregoing, certain regions or telephone operating companies impose additional restrictions on numbering plans, such as the use of prefixes 555, 976, 411, 911, 1-800, 1-900, 1-700, etc.

Traditionally, smart telephones are provided with internally programmed structures to carry out telephone calls, and the appropriate nuances to complete such calls. Because of all the noted regulatory and self-imposed restrictions, such smart telephones must be individually programmed to address such nuances. The disadvantage of such an approach is that the telephones must be specially and permanently programmed during manufacture, and sold for use within certain geographical locations. It is apparent that in view of the regulatory and self-imposed restrictions, the extent to which the smart type of telephone can be efficiently manufactured and sold is becoming limited.

From the foregoing, it can be seen that a need exists for an improved telephone which is line powered, but in which essential circuit can operate during certain on-hook conditions. There is an additional need for a smart telephone which can be manufactured without regard to the geographical area in which it is to operate, or at least field programmable to consider changes or modifications as the need arises. A further need exists for a telephone which can be remotely programmed after it has been installed in its intended area of operation, by an individual owner, a distributor or an operator service provider. Because of the extensive use and programming apparatus available, there is a need for a highly secure method of achieving access by authorized persons to the telephone programming circuits.

SUMMARY OF THE INVENTION

In accordance with the present invention, the disclosed telephone substantially reduces or eliminates the disadvantages and shortcomings associated with the prior art techniques. According to the invention, power is supplied to the various telephone circuits by loop current during off-hook conditions of the telephone; and during on-hook conditions, the telephone of the invention includes a microprocessor powered by ring back current. A versatile nonvolatile programmable memory is utilized with the microprocessor for storage of call routing information when the telephone set circuits receive no power from the telephone line. Moreover, in the preferred form of the invention, the memory is of the EEPROM type, including a storage architecture for maximizing usage of the memory and enhancing the versatility of the telephone set, irrespective of the regulatory constraints placed on telephone calls, based upon geographical areas.

In one unique application of the invention, the telephone set can automatically respond to incoming calls without intervention by the user. Such an application includes a remote programming mode, in which a programmer can access the telephone set of the invention over the telephone line and program the memory locations of the nonvolatile memory, without the necessity of the handset being removed from the cradle of the telephone set. On the occurrence of a prescribed number of ring back signals, the microprocessor closes the telephone line loop, thereby simulating an off-hook condition. However, since the microprocessor must be functional before the closure of the loop, and therefore it must receive power even though the hook switch is open and no line current is flowing. In the preferred form of the invention, the microprocessor is powered by the ring back current. The microprocessor utilized is preferably of the type which includes a "sleep" mode and "running" mode. During the sleep mode, very little current is required to maintain the microprocessor circuits in a functional static state. The microprocessor is placed in a sleep mode between bursts of ringing current. During ringing of the telephone set, a rectifier-filter circuit converts the ringing signals into a DC power sufficient to maintain the microprocessor in a functional running mode. The bursts of ringing signal are also processed and are provided as an interrupt to the microprocessor. In such mode of operation, the interrupt causes the microprocessor to begin executing instructions to increment a counter on the occurrence of each burst of ringing signals, and if the counter is not equivalent to a predetermined number of counts, the microprocessor returns to a sleep mode. On the other hand, if a sufficient number of ringing cycles has occurred, as determined by the output of the counter, the microprocessor causes a simulated off-hook condition of the telephone line, thereby completing the loop so that the loop current is then sufficient to fully power the circuits of the telephone set. An exchange of information between a modem circuit within the telephone set and remote programming facilities can then be carried out to program the nonvolatile EEPROM memory associated with the microprocessor.

The nonvolatile EEPROM memory of the invention includes an efficient architecture, in which defective locations thereof, due to long term or excessive memory write operations, can be detected, whereupon other unused memory locations can be utilized. Efficiency of the use of the microprocessor memory and of routing calls is realized by the use of a file allocation table and other associated tables, such as an input dialing pattern table, an output dialing pattern table and an area code-/exchange code table. Each file allocation table entry includes a length byte and an address for pointing to the other memory areas in the general data storage section. Each entry in the file allocation table points to a different one of the other tables which reside in a general storage area of the memory. In utilizing the tables in the general storage area by the microprocessor, access is always made by obtaining an address thereof from the entries in the file allocation table. Thus, there is no direct table-to-table routing in the general storage area. In the event a memory location in the general storage area becomes defective, such as a counter, reprogramming of the EEPROM is minimized. As a result, a first entry in the file allocation table points to the unused memory areas which can be subsequently utilized.

The telephone set of the invention is programmable with remote programming software which has a unique number with respect to individual owners of the telephone set, distributors, and Operator Service Providers (OSP), each of whom is also provided with a unique password. Hence, to access the programming circuits of the telephone, the software number and the password must match. This provides three levels of security such that unauthorized persons cannot program other telephone sets and perhaps misappropriate the revenue.

BRIEF DESCRIPTION OF THE DRAWINGS

Further features and advantages will become apparent from the following and more particularly description of the preferred embodiment of the invention, as illustrated in the accompanying drawings in which like reference characters generally refer to the same parts, elements or functions throughout the views, and in which:

FIG. 4b shows exemplary entries of the file allocation table;

FIG. 5 illustrates the path taken by the processor control in accessing the various entries and files of the memory to complete a telephone call;

FIG. 6 is a tabulation of various commands which can be carried out by the processor control in outputting a dialing sequence;

FIG. 7a illustrates the NPA/NXX table structure;

FIG. 7b shows the NXX entries of the NPA/NXX table as referenced to a single NPA;

FIG. 8 shows the format structure of an NPA/NXX file description;

FIG. 9 shows exemplary input dialing patterns and the digit sequence matched by each file;

FIG. 10 illustrates a traversal of the memory tables by the processor in carrying out an exemplary operator assist type of call; and FIG. 11 illustrates the user and software password structure.

DETAILED DESCRIPTION OF THE INVENTION

General

Figure 1:
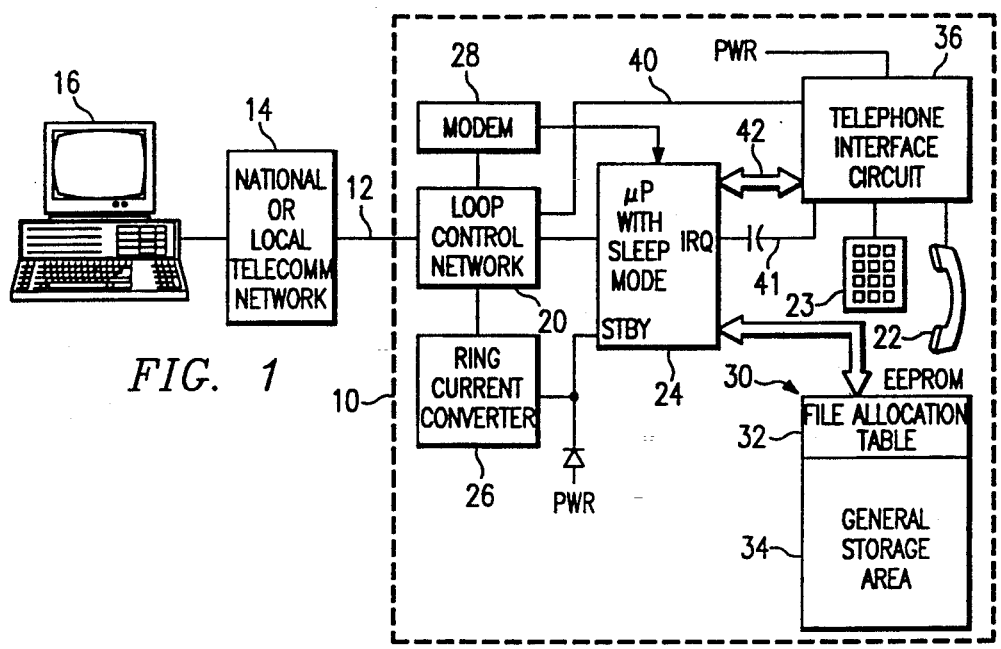
FIG. 1 is a generalized functional block diagram of the telephone set of the invention.

With reference to FIG. 1, there is shown an application in which the invention may be advantageously practiced. Shown in basic block diagram form is the ring current powered telephone set 10 of the invention connected by a standard telephone subscriber line 12 to a telephone switching system 14, which may be a PBX, local central office, or other national telecommunication network or common carrier. Other types of telecommunication switching systems and telephone lines can be utilized with equal effectiveness with the telephone set 10 of the invention. Generally, the only restriction imposed by the telephone set 10 on the telephone line 12 is that it be capable of supplying loop current for powering the various circuits of the telephone set 10. Also, and in accordance with an important feature of the invention, the telephone set 10 employs an automatic answer feature which allows the telephone set 10 to respond to programming commands on the occurrence of a prescribed number of ringing signals, whereupon the telephone set 10 can be programmed from a remote facility such as shown by reference character 16. As will be described in more detail below, the telephone set 10 is powered by the ring back current during the ringing sequence, without drawing DC power from the telephone line 12. The remote programming facility 16 can be a computer or other equipment connected to a modem so that conventional programming command signals can be carried by standard telephony equipment to the telephone set 10.

With more specific reference to the telephone set 10, there is included a telephone line loop control circuit 2 which is adapted to provide simulated loop closures during remote programming modes, as well as loop closures in response to off-hook conditions of a hand set 22 with which the telephone set 10 is equipped. While the loop control circuit 20 can accommodate standard tip and ring loop start subscriber line loop start signalling, such circuit 20 can also accommodate ground-start type of telephone lines. The loop control circuit 20 operates under control of a microprocessor 24 which is programmed to carry out the normal functions of a telephone set, as well as the programming of a memory 30 from the remote programming facility 16. In accordance with another feature of the invention, the microprocessor 24 is preferably of the type having a "sleep" mode, wherein the microprocessor remains in a functional static state during a reduced power state. The microprocessor 24 is placed in the sleep mode during silent periods of the ringing cycle, and particularly during the four second silent period to maintain functional the various registers and memory circuits in the microprocessor chip. During the two second active ringing period, sufficient AC power is supplied over the telephone line 12, and rectified, to power all of the circuits of the telephone set 10. The operational characteristics of the telephone set 10 during the sleep mode of the microprocessor 24 will be described in more detail below.

The telephone set 10 is also equipped with a ring current converter 26 for converting the ringing current supplied over the telephone line 12 into a DC supply voltage operable to power the microprocessor 24. Preferably, the ring current converter 26 stores sufficient energy to supply the microprocessor 24 with DC throughout the four second silent period of the ringing cycle, during which time the microprocessor 24 is in the sleep mode and is operable with a lower level of power supplied at its input. A modem 28, internal to the telephone set 10, is provided for communicating with the remote programming facility 16 so that the microprocessor 24 and associated circuits can be programmed without intervention by an operator or other personnel at the site of the telephone set 10.

A nonvolatile memory 30 is accessible by the microprocessor 24 during the remote programming mode for storing data in the memory 30, which data is utilized by the microprocessor 24 in carrying out and routing telephone calls. In accordance with another feature of the invention, the nonvolatile memory 30 includes a unique architecture for enhancing the versatility thereof. Particularly, the memory 30 includes a small area file allocation table 32 having entries, each of which point to a different section in the general storage area 34 of the memory 30. The general storage area 34 contains contiguous data tables which are utilized during the completion of telephone calls. The details of the architecture of the nonvolatile memory 30 are described in more detail below. The memory 30 is of the nonvolatile type so that the data stored therein is not lost during periods when the telephone set 10 is without power, such as when the loop of the telephone line 12 is open, e.g., on-hook, or when the telephone is unplugged from line 12 and moved to another location.

The telephone set 10 of the invention is programmable to take into consideration the idiosyncrasies of completing telephone calls in accordance with local, state and national constraints and regulations. Accordingly, and for example, if a telephone call involves different jurisdictions which impose different constraints on the telephone call, the telephone set 10 will carry out the telephone call according to such constraints, all transparent to the user of the telephone set 10.

The telephone set 10 is initially programmed to respond to remote programming apparatus by detecting a predetermined number of telephone ringing cycles, such as ten. The number of cycles should be preferably selected to be more than that normally encountered during routine incoming calls before a user lifts the handset 22 and begins audio communications. Hence, when it is desired to utilize a remote programming facility 16 to program the registers and memory areas of the telephone set 10, programming operations are commenced by the facility 16 by the placement of a routine telephone call to the telephone set 10. The telecommunication switching system 14 either transfers or initiates ringing signals to the telephone set 10, on the telephone line 12. During the ringing cycle, the telephone set 10 remains in an on-hook condition, but such ringing signals are processed through the loop control circuit 20 and converted by a ring current converter 26 to a DC voltage supplied to the microprocessor 24 which is in standby state. The ringing signals are concurrently coupled by the loop control circuit 20 on line 40 to a telephone interface circuit 36 and therethrough to an interrupt request (IRQ) input of the microprocessor 24, via line 41. During the conventional two second ring period of the cycle, the interrupt request wakes up the microprocessor 24 and causes it to begin executing instructions at a prescribed interrupt instruction location. The microprocessor 24 is programmed to respond to each ringing period by incrementing an internal counter for each such two-second ring period. In addition, the counter is compared with a predetermined number, such as the number ten to determine if the prescribed number of ring periods have occurred. If less than the prescribed number of ring periods have occurred, the microprocessor 24 places itself back in the sleep mode. During the four second intervals between ringing periods, the ring current converter 26 supplies sufficient stored energy to the microprocessor 24 to maintain it in the sleep mode. On the occurrence of the 10th ringing cycle, an affirmative indication results from the comparison of the counter, whereupon the microprocessor 24 enters an auto-answer mode. Such mode is commenced by the microprocessor 24 causing the loop control circuit 20 to close the telephone line loop, whereby the DC line current supplies power to the circuits of the telephone set 10, via the interface circuit 36 on the PWR output. When the telephone set 10 is powered by the line current of the telephone line 12, the microprocessor 24 can operate in a run mode and become fully operational. In the run mode, during remote programming, the microprocessor 24 causes the internal modem 28 to become operation so that programming signals transmitted by the remote programming facility 16 can be received by the internal modem 28 and coupled to the microprocessor 24. The microprocessor 24 is programmed with a routine to receive the programming signals and program the memory 30 accordingly. The memory 30 can be programmed as to routing information tables for completing telephone calls, based upon digits input by the user of the telephone set 10 during the call.

As noted above, the telephone set 10 can be advantageously employed in an efficient manner for completing local or long distance telephone calls. An exemplary sequence of operations for completing an outgoing telephone call is as follows. In initiating a telephone call, a user of the telephone set 10 lifts the handset 22 off hook and inputs the digit information via the touchtone key pad 23. Such digits are coupled to the microprocessor 24 via the bus 42. The microprocessor 24 accesses the memory 30 and compares the digits input by the user against an input dialing pattern string, which is pointed to by an address in the file allocation table 32. The dialed digits are compared with pattern entries until an affirmative response is produced, whereupon an output is produced, directing the microprocessor back to an address in the file allocation table. The microprocessor is pointed to different allocation table entries depending on the type of call. For a long distance call, the address found in the file allocation table will point to an NPA/NXX table comprising a number plan area (NPA) header referencing various local exchange codes. The NPA/NXX table produces another file allocation table entry which has an address pointing to a table of the output dialing patterns. The output dialing pattern selected causes the microprocessor 24 to transmit DTMF tones or dial pulses over the telephone line 12, with the appropriate substitutions indicated by the information from the digit analysis of the output dialing pattern table. Appropriate modifications to the user dialed digits are made in the output dialing pattern table to accommodate nuances arising from regulations interposed by various geographical or regional constraints on telecommunications. This structure can route telephone calls according to constraints, all transparent to the user. For example, if a call is placed from one LATA to another, the NPA/NXX table can be structured such that the proper operator services are invoked.

For local or other calls, the address found by the microprocessor in the file allocation table may bypass the NPA/NXX table and point directly to an output dialing pattern table, the instructions of which can cause the digits input by the user to be output directly.

Circuit Operation

Figure 2B:
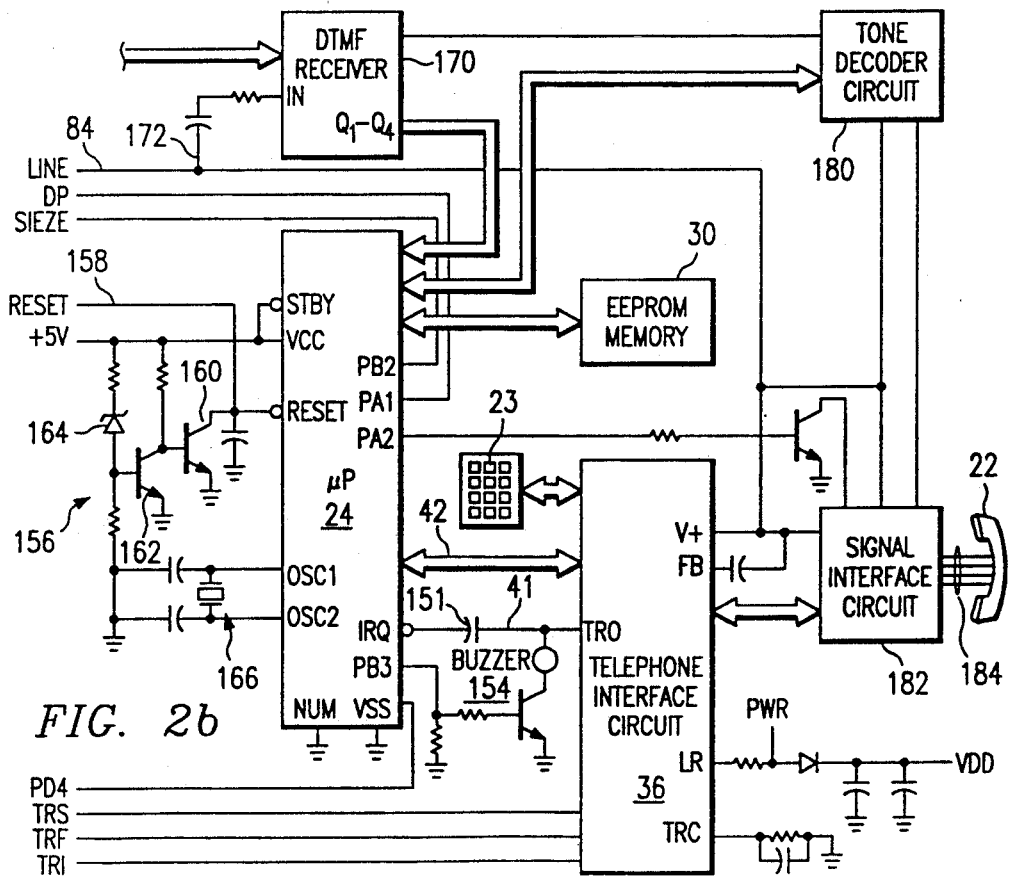
FIGS. 2a and 2b are detailed electrical schematic drawings of the telephone set of the invention.
Figure 2A:
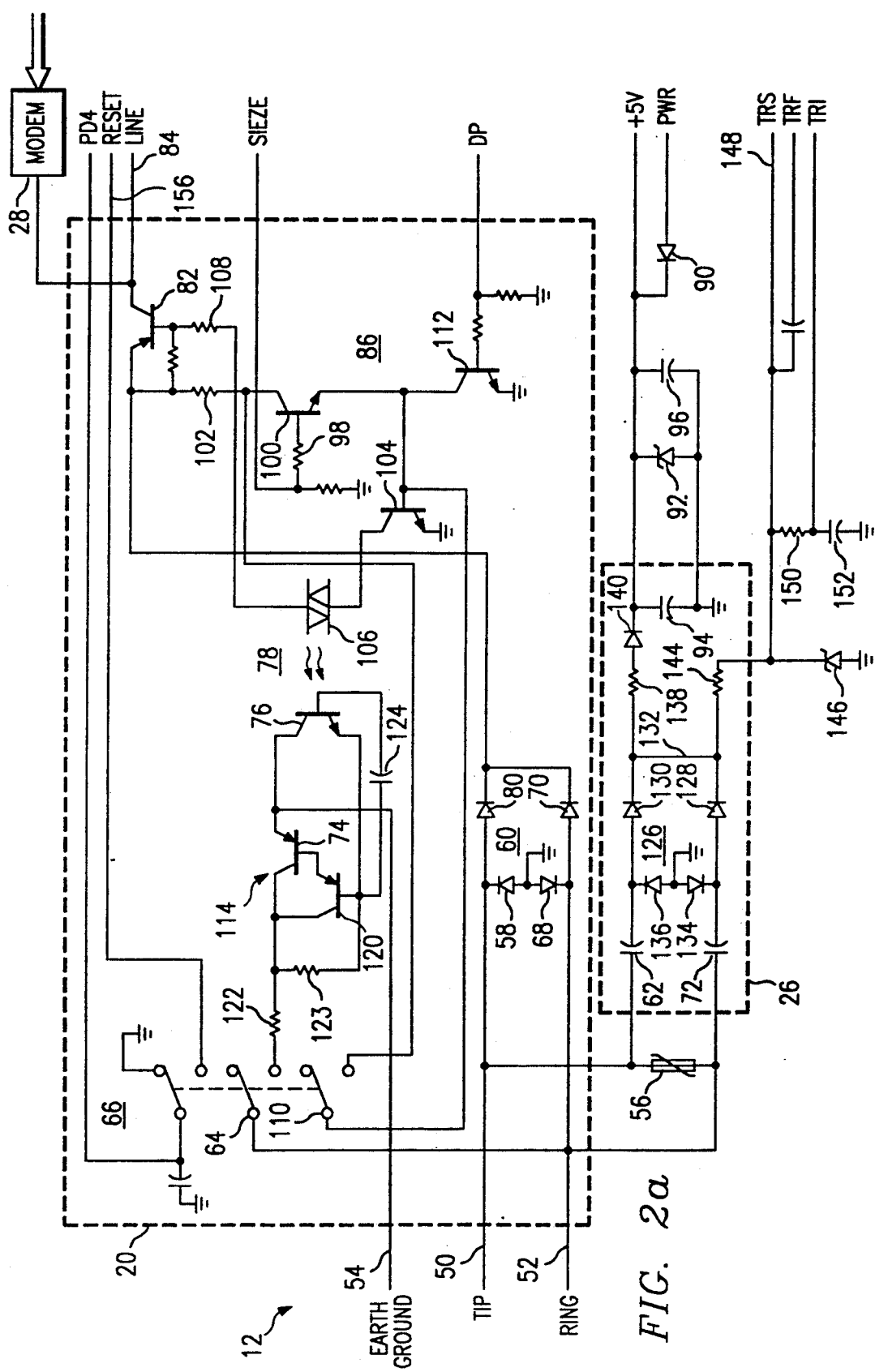

Turning now to FIGS. 2a and 2b of the drawings, there is illustrated the detailed construction of the various circuits of the telephone set 10. The loop control circuit 20 is connected to the tip conductor 50, the ring conductor 52 and the earth ground conductor 54, all comprising the telephone line 12. The tip conductor 50 is connected to an over voltage protector 56 as well as to the cathode of a diode 58 and the anode of a diode 80 forming a part of a DC bridge 60. The tip conductor 50 is also connected to a series coupling capacitor 62 in the ring current converter 26. The telephone line ring conductor 52 is connected to a pole 64 of a telephone hook switch 66. The ring conductor 52 is further connected a cathode of diode 68 and the anode of diode 70, each of which comprise part of the DC bridge 60. Further, the ring conductor 52 is connected to a coupling capacitor 72 in the ring current converter 26. The earth ground conductor 54 is connected to the emitter of a transistor 74, as well as the collector of a transistor 76 which forms a part of an optical isolator 78.

With reference back to the DC bridge 60, a fourth diode 80 of the bridge has a cathode connected to the cathode of diode 70, the junction of which carries positive polarity current to the emitter of a series transistor 82. The transistor 82, when driven into conduction, supplies line current on line 84 to the various circuits of the telephone set 10. The loop control circuit 20 includes another circuit, generally designated 86, which includes the series transistor 82, for controlling loop closures of the telephone line 12 irrespective of the condition of the hook switch 66. The microprocessor 24 (FIG. 2b) controls the circuit 86 for simulating loop closures and thus seizure of the telephone line 12, even when the handset 22 is on hook, as shown by the position of the hook switch 66. The microprocessor 24 can also pulse line DP to simulate dial pulsing of the telephone line 12.

During off-hook, or simulated off-hook conditions, the flow of current is from the tip conductor 50 through the DC bridge 60 and into the emitter of the series transistor 82. When the microprocessor 24 forces transistor 82 into conduction, line current is carried on conductor 84 to the V+ input of the telephone circuit 36. Unregulated five volt power is provided on the LR output of the telephone interface circuit 36 and provided as power on the PWR output to the other circuits of the telephone set 10, including the microprocessor 24. Power is supplied from the telephone interface circuit 36 to the microprocessor Vcc input, through the diode 90 (FIG. 2a). The zener diode 92 regulates the voltage on the PWR conductor to about five volts. A 220 microfarad capacitor 94 provides energy storage and filtering for the power supplied to the microprocessor 24. A small value capacitor 96 is provided to filter higher frequency variations in the voltage coupled to the Vcc input of the microprocessor 24. As will be described in more detail below, the large capacitor 94 is effective to provide sufficient energy and thus voltage to the standby (STBY) input of the microprocessor 24 during the four second silent periods of a ringing cycle. A return path of the line current from the various circuits of the telephone set 10 is through the ground between the anodes of the DC bridge diodes 58 and 68, and through the ring conductor 52. As can be seen, the DC bridge 60 is effective to allow the circuits of the telephone 10 to be powered by the line, irrespective of the polarity of the voltage applied to either the tip conductor 50 or the ring conductor 52 of the telephone line 12.

During actual on-hook conditions of the telephone set 10, simulated off-hook conditions can be achieved by the programming of the microprocessor 24 to place a steady state signal on the seize output thereof (PB2 pore). Such output is connected through a resistor 98 to the base of a transistor 100. Transistor 100 is thereby driven into conduction, conducting a portion of the line current from the DC bridge 60 through resistor 102 and from the emitter of transistor 100 to the base of transistor 104. Transistor 104 is driven into conduction, thereby drawing collector current through one of the diodes of the diode pair 106 of the optical isolator 78. The diodes 106 of the optical isolator 78 are connected through a resistor 108 to the base of a series transistor 82. When current flow is established between the base of transistor 82 and the collector of transistor 104 in the manner described, the series transistor 82 is driven into conduction, thereby supplying telephone line current to the circuits of the telephone set 10. Such current provides a simulated off-hook condition even though the handset 22 is in the cradle.

Should the user of the telephone set 10 remove the handset 22 from its cradle, the poles of the hook switch 66 change positions from that shown, whereby the lower contacts 110 effectively short circuit the collector-emitter terminals of transistor 100 and thereby maintain transistors 104 and 82 conducting, irrespective of the logic state on the seize output of the microprocessor 24. During off-hook conditions, the microprocessor 24 can cause dial pulse signals to be output on the telephone line 12 by appropriately pulsing the dial pulse (DP) output of the microprocessor 24. When the DP output of the microprocessor 24 is driven to a logic high, transistor 112 is driven into conduction and thereby cuts off base drive to transistor 104. Accordingly, line current is momentarily interrupted, depending upon the time period by which the DP output of the microprocessor 24 is driven to a high logic level. Normally, dial pulse signalling is achieved by interrupting the telephone line current for a number of one hundred millisecond intervals, depending upon the digit being pulsed. For example, if the digit seven were to be outpulsed, the microprocessor 24 would be programmed to provide seven 40 millisecond logic high signals on the DP output thereof, each signal being spaced apart by about 60 milliseconds.

The loop control circuit 20 also includes a ground start circuit 114 to accommodate telephone lines providing ground start signalling. Certain telecommunication switching systems operate with ground start signalling rather than loop start signalling where the tip and ring conductors are looped together through the circuits of the telephone set by the closure of hook switch contacts. Ground start signalling, on the other hand, is provided by the telephone set 10 by momentarily grounding the ring conductor 52 to thereby signal the telephone switching system of an off-hook condition. The microprocessor 24 can be programmed to respond to loop start or ground start signalling, depending upon the geographical region in which the telephone set 10 is used. Ground start operation is typically carried out only during the origination of a call, not during the answering of a call. The central office or PBX switching system connected to the telephone line 12, typically applies continuous −48 volts to the ring conductor 52, while the tip conductor 50 remains open circuit. When it is desired to seize the telephone line 12, the ring conductor 52 is grounded momentarily, thereby drawing current from the central office. The current is sensed by central office circuits, and in response thereto the central office grounds the tip conductor 50, whereby loop current flows in the tip and ring conductors 50 and 52 of the telephone line 12.

Assuming the telephone set 10 is connected to a ground start type of telephone line 12, the switching system to which the line 12 is connected at the other end applies −48 volt to the ring conductor 52. When the user of the telephone set 10 lifts the handset 22 from the cradle, thereby moving the hook switch 66 to the off-hook position, the ring conductor 52 is connected through the switch pole 64 to the ground start circuit 114. Particularly, the ring conductor 52 is connected through the hook switch 66 contacts to the collector terminals of Darlington-connected transistors 74 and 120. The ring conductor 52 is connected through the hooks switch 66, through series resistors 122 and 124 to the base of the drive transistor 120 of the Darlington pair. The emitter of the transistor 74 of the Darlington pair is connected to the collector of the optical isolator transistor 76, while the base of the drive transistor of the Darlington pair is connected to the emitter of the optical isolater transistor 76. At this time, the optical isolator transistor 76 is nonconducting, as the seize output of the microprocessor 24 is at a logic low state. Accordingly, the optical isolator transistor 76 does not affect the Darlington transistors 74 or 120, whereby such transistors are driven into conduction. As noted in FIG. 2a, the emitter of drive transistor 74 of the Darlington pair is connected to the earth ground conductor 54 of the telephone line 12. The conductive state of the Darlington connected transistors 74 and 120 thereby couples the earth ground potential therethrough, through the hook switch pole 64 and to the ring conductor 52.

After a specified period of time after the telephone handset 22 has been removed from the cradle, generally one second, the microprocessor 24 is programmed to drive the seize output thereof to a logic high. When so driven, transistors 100 and 104 will be driven into conduction, thereby drawing current through the optical isolator diode 106. This causes the optical isolator transistor 76 to conduct, thereby short circuiting the emitter of drive transistor 74 to the base of transistor 120 of the Darlington pair. This effective short circuit cuts off both such transistors, whereby the earth ground is removed from the ring conductor 52.

A capacitor 124 is connected between the base of the optical isolator transistor 76 and the base of the Darlington drive transistor 120 to slow the response of the circuit to signals such that the dial pulse signals output by the microprocessor 24 on the DP line during dial pulsing of digits do not appear as signals to the ground start circuit 114, which otherwise would interfere with the ground start operation.

From the foregoing, it can be appreciated that by constructing a loop control circuit 20 according to the foregoing a single activated output of the microprocessor 24 is effective to close the telephone line loop and allow loop current to flow, as well as provide a momentary ground signal on the ring conductor. This feature greatly facilitates the use of the telephone set 10 of the invention with telecommunication systems having different types of telephone line signalling.

With reference now to the ring current converter 26, there is illustrated circuitry for processing ringing signals carried on the telephone line 12 and converting the same into a DC voltage for powering the microprocessor 24. Ringing signals, typically of about a ninety volt AC peak-to-peak level, are coupled from the tip and ring conductors 50 and 52 through respective coupling capacitors 72 and 62 in the ring current converter 26. The coupling capacitors 72 and 62 couple the ringing signals to a diode bridge circuit 126. The AC diode bridge 126 includes diodes 128 and 130 having a common cathode output defining node 132. Further included are diodes 134 and 136 having a common anode connection to ground. The AC bridge 126 is configured to provide rectified positive output ringing signals on node 132. The positive rectified AC signals are coupled through a series resistor 138 and through a forward biased diode 140 to the supply voltage input (Vcc) of the microprocessor 24. As can be seen, the Vcc and STBY inputs of the microprocessor 24 are connected together so that the microprocessor can be supplied both with a standard five volt level as well as a lower standby three volt level. In the preferred form of the invention, the microprocessor 24 is of the type HD63705V0, obtainable from Hitachi. The noted type of microprocessor includes a sleep mode which can operate on a voltage as low as three volts. In such a mode, only a few microamperes of current are drawn by the microprocessor, thereby requiring little drain on the supply. The construction and operation of microprocessor is described in detail in U.S. Pat. Nos. 4,748,559 and 4,758,945.

The rectified AC signals provided by the AC diode bridge 126 and coupled through the diode 140 are filtered into a DC voltage by the large filter capacitor 94. The filter capacitor 94 is about 220 microfarads, sufficient to provide adequate filtering of the AC signals, and sufficient to sustain power to the microprocessor 24 in the sleep mode during the four second time interval between ringing periods. The zener diode 92 prevents the voltage on the power input to the microprocessor 24 from exceeding a level of about 5.1 volt.

While the ringing signals are utilized for powering the microprocessor 24, such signals are also utilized to provide interrupt signals which are coupled to the IRQ input of the microprocessor 24. The rectified ringing signals appearing on the AC diode bridge node 132 are coupled through a series resistor 144 and clamped to about a 30 volt level by zener diode 146. The clamped and rectified signals are then coupled on line 148 to the TRS input of the telephone interface circuit 36. The telephone interface circuit 36 is a readily obtainable integrated circuit of the type MC34010P, obtainable from the Motorola Corporation. Such a circuit 36 receives ringing signals on the TRS input thereof and provides a digital output on the TRO output. The TRO output of the telephone interface circuit 36 is coupled by line 41, and through a coupling capacitor 151 to the interrupt request (IRQ) input of the microprocessor 24. Accordingly, when ringing signals are received by the telephone set 10, such signals are processed by the telephone interface circuit 36 and provide an interrupt signal to the microprocessor 24. Ringing signals are also coupled by resistor 150, and filtered by capacitor 152 to the TRI input of the telephone interface circuit 36. The filtering of the rectified ringing signals by resistor 150 and capacitor 152 provide an envelope signal to the TRO input of the interface circuit 36. An optional piezo-type of buzzer may be provided for the audio ringing of the telephone, according to the circuit 154. Signals representative of ringing output by the TRO port of the interface circuit 36 can be provided as an input to the buzzer circuit 154. Also, the microprocessor output ringer can enable or disable the operation of the buzzer circuit 154 to either allow audio ringing or to suppress such ringing.

Control signals are passed between the microprocessor 24 and the telephone interface circuit 36 via bus 42. An additional circuit 156 provides reset capabilities to the microprocessor 24. Conductor 158 is connectable through contacts of the hook switch 66 to the ring conductor 52 so that at the beginning of the ground start signalling, where the ring conductor 52 is grounded by the loop control circuit 20, the microprocessor 24 is also reset. Another circuit of the reset circuit 156 includes transistors 160 and 162, as well as a zener diode 164. Such circuit components are utilized to reset the microprocessor 24 when power is initially supplied thereto via the PWR supply. The power up reset circuit functions by first driving transistor 116 to conduction, whereby the reset input of the microprocessor 24 is driven to a logic low, thereby resetting the microprocessor. Transistor 162 is not yet driven into conduction, as during the rising transition of the input power, the zener diode 164 has not exceeded its threshold which is about four volts. However, when the supply voltage on the PWR bus exceeds the four volt level, the zener diode 164 breaks down, thereby driving transistor 162 into conduction and cutting off transistor 160. Thus, the reset input of the microprocessor 24 is then driven to a logic high state. A logic low pulse is effectively generated to reset the microprocessor 24 during power up. A crystal circuit 166 is coupled to the oscillator inputs of the microprocessor 24 for providing a 500 Khz signal for operating the internal oscillator of the microprocessor 24.

An internal modem 28 is provided with the telephone set 10, together with a DTMF receiver 170 for receiving DTMF programming signals from the telephone line 12, converting the same to digital signals for coupling to the microprocessor 24. The modem is of an integrated circuit type MM74HC943, obtainable from National Semiconductor. The DTMF receiver 170 is of the 8870 type integrated circuit, obtainable from Mitel. Those skilled in the art will readily appreciate that the microprocessor 24 can be programmed to operate in accordance with well known transmission protocols for establishing communications with the remote program facility 16 so that signals can be transferred therefrom and converted to digital signals for programming the nonvolatile memory 30. Essentially, DTMF programming signals received by the telephone line 12 are coupled via line 172 to the DTMF receiver 170. Such signals are decoded into a four-bit digital word, output on the Q1-Q4 outputs thereof. Thus, 16 types of DTMF signals are capable of being decoded by the receiver 170. The output digital signals are coupled to the microprocessor 24 as the signals to be programmed as data in the nonvolatile memory 30. The modem 28 operates in a conventional manner under control of the microprocessor 24 for establishing communications with the remote program facility 16. As will be described in more detail below, communications can be established to the microprocessor 24 only after the correct password and software code are received.

A tone decoder circuit 180 operates under control of the microprocessor 24 for receiving non-DTMF type of tones from the telephone line 12, decoding the same and coupling indications thereof to the microprocessor 24. For example, the tone decoder circuit 180 is programmable to detect 350 hertz, 400 hertz and 440 hertz tones. The tone decoder circuit is also connected to the telephone interface circuit 36 as well as a signal interface circuit 182. The tone decoder circuit and the signal interface circuit 182 are substantially identical to the counterpart circuits disclosed in U.S. patent application Ser. No. 164,505 entitled "Personalized Telephone for Automatic Access to Operator Services", filed Mar. 7, 1988, and assigned to the assignee hereof. The disclosure thereof is incorporated herein by reference. Essentially, the signal interface circuit provides an interface between the telephone interface circuit 36 and the handset 22 so that audio transmit, receive, side tone and power can be coupled on the telephone handset conductors 184, and so that bidirectional audio communications can be carried on between the handset 22 and the telephone line 12.

In accordance with an important feature of the invention, the nonvolatile memory 30 is an EEPROM type of memory which is electrically erasable so that it can be reprogrammed. However, a disadvantage attendant with current EEPROM type of memories is that such a memory can undergo only a limited number of write cycles before the written storage locations deteriorate. Hence, the memory 30 is larger than it need actually be to thereby allow for the use of new areas, in the event that other often-written areas become deteriorated. Also, because of the file allocation table and associated architecture of the memory, the reprogramming thereof to utilize new areas can be accomplished efficiently and easily. In practice, the memory 30 has 2k×8 storage locations, and is of the type X24C16, obtainable from Xicor, Inc. The reading and writing of the memory 30 are accomplished by the microprocessor being programmed to drive the MEMCLK and MEMDTA outputs thereof (not shown), which are connected to the memory 30. Those skilled in the art having available the data sheets of the microprocessor 24 as well as those of the memory 30 can readily devise software for programming the memory 30.

Call Routing Memory Structure

In accordance with an important feature of the invention, the telephone 10 is programmable, either locally or remotely, with a data structure which provides a high degree of flexibility to facilitate the use of the telephone to accommodate different considerations imposed by tariffs or regulations in different geographical locations. Indeed, the telephone of the invention can be programmed so that appropriate operator services or other matters can be considered in routing the telephone call, all transparent to the user of the telephone. In other words, in completing a long distance call from one geographic location to another, the telephone set analyzes the digits according to a table structure, and depending upon which operator services should be invoked based on geographical considerations, such route is taken to complete the call even though not specified by the person using the telephone. In accordance with another feature of the invention, a memory structure is employed which is easily modifiable to accommodate new or changed call routing constraints.

Figure 3:
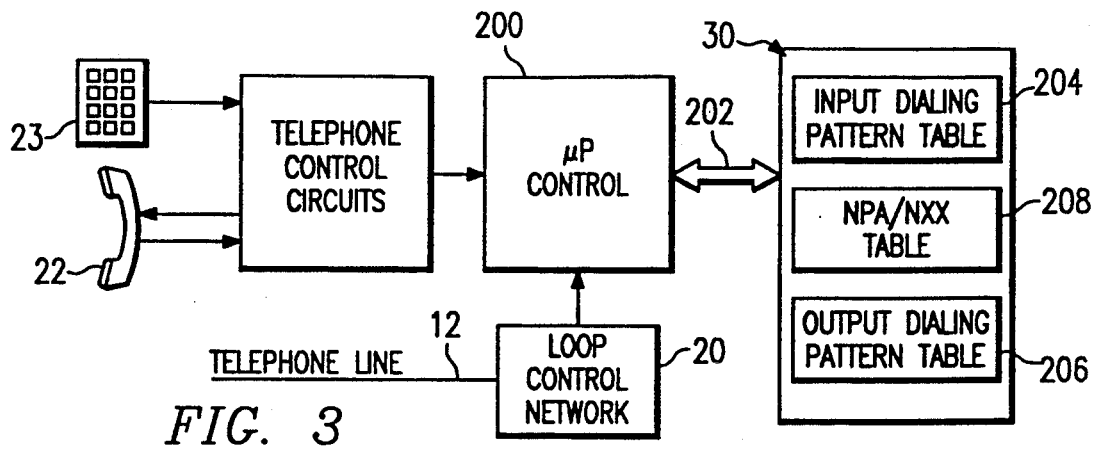
FIG. 3 is an illustration of the processor control and the memory architecture of the nonvolatile memory utilized by the telephone set of the invention.

FIG. 3 illustrates a simplified block diagram of the circuits of the telephone set of the invention, some of which were described above. The diagram of FIG. 3 further illustrates the program controlled processor 200, including the microprocessor 24 and other circuits described above, coupled to the memory 30 in which data is structured to facilitate easy alteration or addition thereto due to either faulty memory locations or changes in the routing of telephone calls because of new tariffs or regulations. To that end, the program controlled processor 200 is connected by a read/write bus 202 to the nonvolatile memory 30, which in the preferred embodiment comprises an EEPROM. Such a memory is electrically erasable so that it can be programmed, or written, much like a static or dynamic random access memory. Unlike static or dynamic RAMs, the EEPROM is nonvolatile and can retain data without being supplied with power. However, a characteristic disadvantage of a EEPROM memory is that the number of write cycles it can undergo without degradation is limited. Typically, current EEPROM memories are constructed with locations which can be written as many as 10,000 times, and often more, before the likelihood of degradation is imminent. As noted above, a nonvolatile memory is preferable for use in the telephone of the invention as it may be disconnected from power and still retain the information written therein. The removal of power from a telephone set memory is highly likely, and can occur every time the telephone set is disconnected from the telephone line 12. Additionally, unless powered by other internal or external means, power is removed from the line when the handset 22 is on-hook.

In the preferred embodiment of the invention, the nonvolatile memory 30 is adapted for storing an allocation table, as well as three other table structures for carrying out the routing of telephone calls preprogrammed therein. Briefly, the nonvolatile memory 30 includes an input dialing pattern table 204 which is used by the program controlled processor 200 in comparing input dialed digit strings. The table 204 is a fall-through type of table in which the processor 200 progresses until it finds an affirmative response to the comparison. Default conditions can also be provided. Information is stored in each entry of the input dialing pattern table 204 to further direct the processor in routing the call. On an affirmative comparison of dialed digits with entries of the input dialing pattern table 204, the program controlled process 200 can be directed the output dialing pattern table 206 for finding a dialing pattern to outpulse over the telephone line 12. In addition, entries in the input dialing pattern table 204 can be programmed such that on an affirmative comparison, the program controlled processor 200 is directed to an area code/exchange code table 208. The nonvolatile memory 30 can be programmed with a number of such tables 208, each of which is referenced by an area code, and has contiguous memory locations corresponding to central office exchange codes which are pertinent to the area code. The digital state stored in the memory 30 in connection with each exchange code defines whether a telephone call routing should be carried out in accordance with a first routing procedure (digital state 0) or another routing procedure (digital state 1).

Figure 4A:
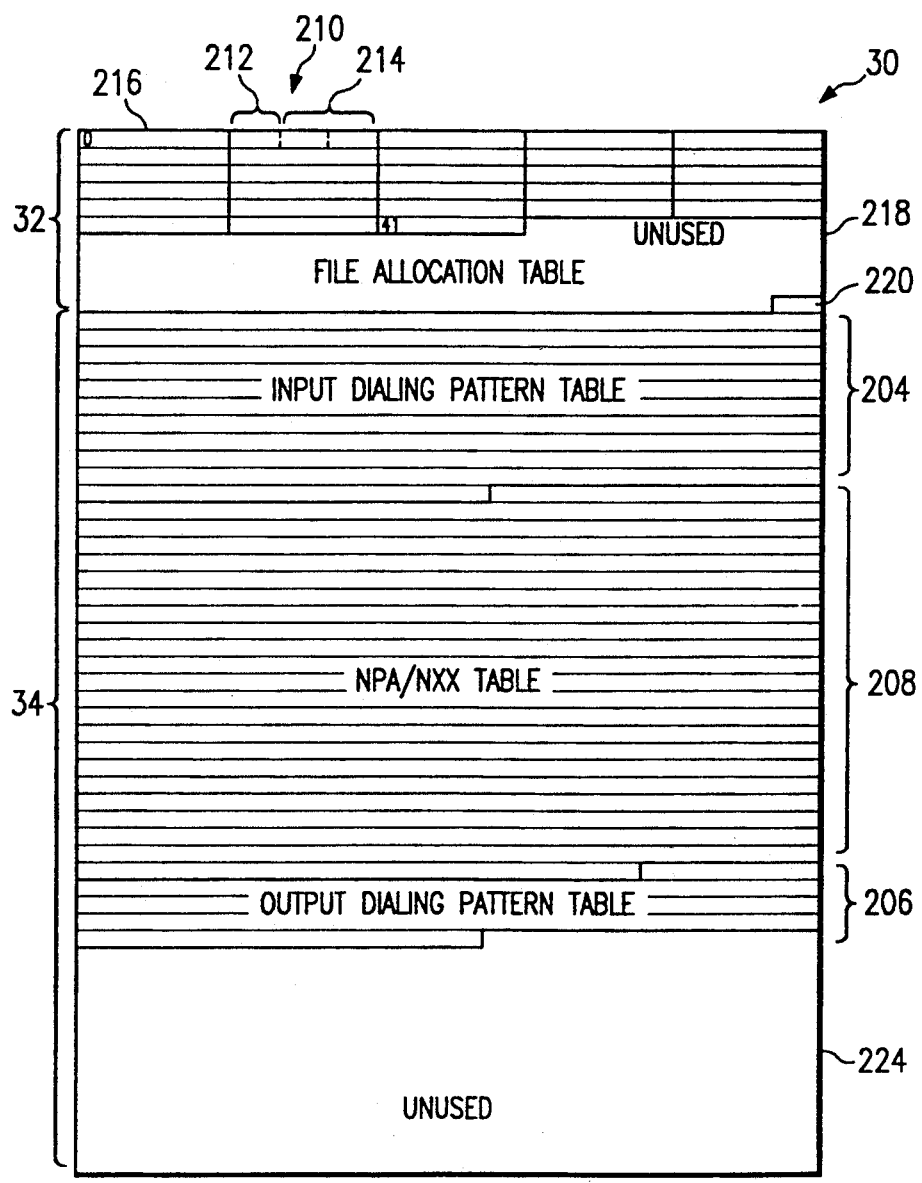
FIG. 4a is an illustration of the nonvolatile memory, sectioned to show the contiguous table structure.

FIG. 4a illustrates in more detail the manner in which the nonvolatile memory 30 is written with data so as to define an architecture which provides a high degree of flexibility to accommodate memory locations which become defective, as well as changes in call routing due to newly imposed regulations. In the preferred embodiment of the invention, the nonvolatile memory 30 comprises a EEPROM with an array of 2KX8 storage locations. While the memory utilized is identified as type X24C16, other memory devices may be used. As noted above, in connection with FIG. 1, the memory 30 includes a first section 32, comprising 256 bytes and capable of storing 85 3-byte files. The files are typically arranged as noted by reference character 210. The first byte 212 defines a length parameter, while the next two bytes 214 define a 16-bit address. When memory section 32 is programmed with the file entries 210, the file allocation table is defined. When the program controlled processor 200 accesses an entry, such as 210, the data is read therefrom to thereafter allow the processor to utilize the 16-bit address of bytes 214 for accessing a corresponding location in the general storage area 34. In addition, the data byte 212 of the entry indicates the number of bytes associated in the general storage area 34 with the 16-bit address 214. As will be described in more detail below, the various entries stored in the file allocation table 32 are accessed by the program controlled processor 200 to carry out various functions in routing telephone calls. In the preferred form of the invention, there are forty-one allocation entries 210, with the remaining storage locations in the file allocation table 32 being free but usable as intermediate address locations to the usage area 84. Also, the free area 218 can be programmed should the memory locations in existing files 210 become defective because the maximum number of write cycles have been exceeded. Also as will be described in more detail below, the addresses 214 in many of the files 210 are intermediate, in that they are employed when the processor carries out accessing between two or more tables in the general storage area 34. In other words, address pointers employed in tables in the general storage area 34 do not directly point to other memory areas in area 34, but rather point back to a file allocation table entry where an address is obtained for accessing the other storage area in the general storage area 34.

With reference again to FIG. 4a, the first three bytes 216 of the file allocation table 32 indicate the next memory location in the file allocation table 32 which is not currently used, but which is available for future use. The 3-byte entries 2–41 of the file allocation table 32 are used in accessing other specific areas or tables in the general storage area 34. There exists an unused memory area 218 in the file allocation table 32 for use as noted above. The last entry 220 in the file allocation table 32 is utilized for checksum purposes, comprising one byte in ascertaining the integrity of the memory structure.

The following description illustrates the current usage of file allocation table entries 2–41, comprising 117 bytes of memory in area 32. Entry 2 of the file allocation table points to an area in the general storage area 34 which define operating parameters of the telephone set itself. Such parameters may include whether output dialing is to be carried out with DTMF signals, or rotary dial pulses. Also designated is whether the telephone ringer 154 is to be switched on or off, and whether the automatic answer flag is enabled. Additionally, the software version is noted in such file, as well as the user password, security registers, automatic number identification (ANI) data and the serial number of the telephone set.

Entries 3–28 of the file allocation table 32 each have addresses point to a corresponding 26 files in the general storage are 34 which define speed dial numbers as well as register locations to storage usage statistics.

Entry 29 of the file allocation table 32 includes an address which points to an area code/exchange code (NPA/NXX) table 208 stored in the general storage area 34.

Entries 30–34 of the file allocation table 32 comprise eleven entries, each with addresses pointing to various call statistic areas in the general storage area 34. Lastly, entry 41 of the file allocation table 32 includes an address which points to a header of the input dialing pattern table 204, also stored in the general storage area 34. As noted above, entries 42–85 of the file allocation table 32 are available for expansion.

With reference now to FIG. 4b, there are shown the entries of the file allocation table 32, in the preferred form of the invention. As noted above, the first three bytes of the file allocation table 32 comprises a special format entry, in that the byte normally allocated to the length of the file comprises a pointer to the next free file allocation table entry.

The next file allocation table entry points to a user area which is 30 bytes long, the first byte of which is utilized for storing flags. This user area byte contains the flags which are available to the user during the programming mode. Further, bit 0 of the first byte in such user area defines a mode in which the telephone 10 is to operate either as a smart phone, or as a dumb phone. If the bit is set, then the telephone reverts to operation as a standard 2500-style telephone. Preferably, the telephone set is initially programmed with such bit set. Programming by the user, or a distributor, to reset the bit can be accomplished so that the telephone operates as a smart telephone, as described herein. Bit 1 of the first byte of such user area determines whether DTMF or rotary outpulsing is to be utilized. When this bit is cleared, the telephone operates in the DTMF mode, and when set, dial pulse signalling is enabled. Bit 2 of the byte defines whether the audible ringer of the telephone set 10 is to be enabled or disabled. When this bit is set, the telephone ringer is enabled to signal incoming calls. When reset, the telephone ringer or buzzer 154 is disabled.

Bit 3 of the byte pointed to in the user area defines the speed of rotary dial outpulsing. When this bit is cleared, 600 ms pauses are interposed between successive digits in the dial-pulse mode. When set, the telephone set pauses 1.2 seconds between digits in order to remain compatible with older central offices.

Bit 4 defines the state of operation of the automatic answer mode. When this bit is set, the telephone set 10 automatically answers incoming ringing and provides a modem answer tone.

Byte 1 of the 30-byte user area pointed to by the file allocation table entry two provides area for the storage of the ASCII representation of the version letter of the software with which the telephone set 10 is programmed. Accordingly, when reading this memory area, users can determine which version of software is employed.

Bytes 2 and 3 of the user area pointed to define a user password. These two bytes contain the four-digit password with which the user gains access to user flag and speed number programming.

Byte 4 of this user area provides storage area for defining the number of audible rings before automatic answering of the telephone set. If such location is programmed as 0, the telephone set 10 will answer before the first audible ring.

Bytes 5–9 of the 30-byte user area define an owner level password. The first four bytes of this field comprise the password which is matched by the processor 200 of the telephone set 10 before granting owner level access thereto. The fifth byte is a collection of flags associated with owner level programming.

Bytes 10–14 of the user area pointed to are dedicated to a distributor level password. The first four bytes of this field contain the password which is matched by the processor 200 of the telephone set 10 before granting distributor level access thereto. The fifth byte is a collection of flags associated with distributor level programming.

Bytes 15–19 of the user area set aside memory locations for operator service provider level passwords. The first four bytes of this field comprise the password which is matched by the processor 200 of the telephone set 10 before granting program access to the operator service provider. The fifth byte is a collection of flags associated with the operator service provider level programming.

Bytes 20–24 of the user area associated with file allocation table entry two comprise five bytes of data for storing the ANI number. This register contains the ten digits corresponding to the identification code registered with the operator service provider. The first six digits are considered to be the home or local area code and central office exchange code (NPA/NXX). The other four digits are unique to the telephone set 10 itself.

Bytes 25–29 of the user area are memory locations in which the serial number of the telephone set is stored. These bytes are initialized at the factory to a null set. This may be programmed with the telephone serial number at registration time for tracking the telephone 10 for warranty purposes.

The next twenty-six entries of the file allocation table 32 are associated with twenty-six corresponding speed dial numbers. Each speed dial number entry has a format, in which bytes 0 and 1 define a speed number usage counter which is incremented each time the speed number is employed. Byte 2 defines the number of digits in the speed number, up to 14 digits, or special commands. Bytes 3-9 define the actual digits of the speed number, as encoded by binary coded decimal techniques.

The next contiguous entry in the file allocation table 32 has an address which points to the area code/exchange code tables. The area code is synonymous with a number plan area (NPA). As noted above, the NPA/NXX tables occupy a contiguous area of memory in the general storage area 34, accessed via the intermediate file allocation entry 29.

File allocation table entries 30-40 contain addresses which point to a number of call statistic registers in the general usage area 34 for tabulating various statistics of the history of the usage of the telephone 10. For example, entry 30 points to an area which maintains a tabulation of the number of incoming calls made by the telephone set 10. Entry 31 points to a memory location which maintains an account of the number of modem accesses. Entry 32 points to an area which maintains an account of the number of splashbacks that were encountered during the use of the telephone 10. A splashback is an instance in which a user of the telephone 10 is automatically connected to an operator service provider not of his own choosing, whereupon a splashback tone is retransmitted from the operator service provider back to the telephone set 10. In this case, the telephone set 10 automatically outdials a predefined digit pattern for connection to yet another operator service.

File allocation table 33 points to a memory area for tabulating the number of off-hook conditions encountered by the telephone set 10. Table entry 34 contains an address pointing to a memory area indicating the number of local programming attempts encountered by the telephone set 10. Table entry 35 includes an address pointing to a memory area storing the number of failures due to the nondetection of a tone transmitted from an operator service provider. File allocation table entry 36 is associated with an address which points to a memory area tabulating the number of partially dialed numbers received by the telephone set 10.

Further entries in the file allocation table 32 include entry 37 which includes an address pointing to a memory area tabulating the number of modem failures, whereas entry 38 points to a memory area maintaining an account of the number of log-on failures. In like manner, entry 39 includes an address pointing to a memory area tabulating the number of checksum failures, whereas entry 40 points to a counter which tabulates the number of EEPROM write operation failures.

Lastly, entry 41 of the file allocation table 32 includes an address pointing to the list of input dialing patterns. As noted above, as a user dials digits into the telephone set 10 of the invention, such digits are checked against a number of input dialing patterns. When the number matches one of the dialing patterns, other data in the dialing pattern is utilized either to point to an output dialing pattern, or to point to the NPA/NXX subsystem table. If the NPA/NXX subsystem is employed, then data associated in such subsystem ultimately indicates the output dialing pattern to be utilized. The input dialing pattern string which is found to be matched with the dial digits indicates the relative positions of the NPA and the NXX locations, and the position and length of the TNI in the sequence of digits dialed by the user. This information is passed to the processor for digit outpulsing purposes. After initial programming of the telephone set 10 according to the foregoing, the memory storage area in the file allocation table 32, after entry 41, is not programmed with data, and can be subsequently used for any purpose. For example, such unused area can be later used in the event any of the entries 1-41 become degraded. In addition, such area can be employed for other telephone features or functions which may be used according to the desires or needs of the owner or operator of the telephone set 10.

The general storage area 34 includes a section which is utilized in storing data corresponding to the output dialing pattern table 206, as well as data corresponding to the area code/exchange code table 208. Again, an area 224 of the general storage area 34 is unused, but can be employed for storing data. In order to conserve memory area, but yet have enough available for future usage, the data stored in the input and output dialing pattern tables 204 and 206, as well as the area code/exchange code table 208 is contiguous data.

The format of an input dialing pattern file is shown in FIG. 5. In order to provide sufficient flexibility for carrying out the routing of routine telephone calls, between ten and twenty different input dialing patterns are typically utilized. The input dialing pattern file 226 is shown accessed via a file allocation table entry 228. The entry 228 indicates that the input dialing pattern table file 226 is 57 bytes in length and starts at hexidecimal address 025C. The first eleven bytes of field 229 define the number of digit pairs to be compared with the dialed digits input by the user of the telephone 10. If a match of the digit pairs is found in the eleven bytes 229, the remainder of the input dialing pattern file 226 is carried out. In the event the processor 200 finds that the input digits do not correspond to those in the field 229, the next input dialing pattern file (not shown) is considered, and so on until a match is eventually found.

The next two bytes of field 230 of the input dialing pattern file 226 indicate, if at all, whether the NPA/NXX table 208 is to be consulted. If so, the first digit in field 230 indicates which NPA table to utilize, while the second position indicates the position of the exchange code in the NPA/NXX table 208. Field 232 of the input dialing pattern file 226 comprises three bytes of data defining the starting address and the length of the telephone number, i.e., the number of digits, which are to be outpulsed in response to a predefined code (*6) which is defined below.

Input dialing pattern file field 234 comprising two bytes, defines the file allocation table entry which is referred to for handling the output dialing of the telephone number. In other words, whether or not the NPA/NXX table 208 is utilized, the file field 234 defines the file allocation table entry used to access an output dialing pattern table to output a specified digit sequence.

Field 236 of the input dialing pattern file 226 comprises three bytes of storage dedicated as a counter which is incremented each time the file 226 is read and carried out as a whole. Field 236 thus constitutes a storage area for usage statistics purposes.

With reference back to field 234 of input dialing pattern file 226, for example, if field 234 includes hexidecimal data corresponding to "99", the processor is directed to file allocation table entry 99 to determine the address of the output dialing pattern sequence, and the number of bytes constituting such sequence. As shown by reference numeral 240, entry 99 indicates that the output dialing pattern sequence constitutes 36 bytes, the starting address being hexidecimal address 28C. In executing an output dialing pattern sequence, the program controlled processor 200 accesses file allocation table entry 99 to obtain the intermediate address 28C, and thereafter accesses such address in the general usage area 34. Further, the program controlled processor 200 will read 36 bytes of data, starting at the address 28C. Such data comprises the output dialing pattern sequence 242, as shown in decimal notation in such file. According to this file entry of the output dialing pattern table 206, the digit sequence to be outpulsed on the telephone line 12 is 1 800 555 1234. The remaining symbols which also constitute a part of the output dialing sequence of file 242 are shown in the table of FIG. 6.

In carrying out the output dialing pattern sequence specified in file 242, the noted digits would be outpulsed by DTMF tones, followed by a period in which the telephone set would wait for precision dial tone transmitted by a remote operator service provider. Then, the telephone set would pause for three seconds before proceeding, after which the contents of the ANI register are outpulsed to the operator service provider. Next, the digits input by the user of the telephone set 10 are outpulsed in the pattern in which they were received and thereafter the telephone set waits for a predefined period of time for a tone. The 3C is an output sequence which means set timeout counter to "3C" 1 second time periods. The "3C" is a hexadecimal number. The last sequence of the output pattern file 242 causes the program controlled processor 200 to allow key pad digits to pass through the phone line for a timeout period which is in this case "3C" periods. As can be appreciated, the instructions noted in the table of FIG. 6 can be employed in different combinations to interpose various wait times or the detection of signals for routing calls to various destinations. Of course, other output dialing pattern codes can be added or utilized as the need arises.

As noted above, file allocation table entry 29 includes an address which points to an area in the general storage area 34 for accessing the area code/exchange code table subsystem. More particularly, the file allocation table entry 29 points to an area in memory which is the NPA/NXX table structure. Such area in memory, will, in turn, include an address which points back up to a file allocation table entry, for example, entry 80. Entry 80 includes an address which then points to a 100 byte area of the general storage area 34 comprising the NPA/NXX tables 208. While the memory could be structured so that the file allocation table entry address points directly to the NPA/NXX table structure, such structure would result in a direct link between memory areas, thus reducing flexibility in utilizing the EEPROM memory. If such a direct link were to exist, a change, addition or modification in the table structure would require a corresponding change in the NPA/NXX structure. With the feature of the present invention, such a change would only necessitate a change in the file allocation entry address, thereby maintaining the general storage area 34 as uncommitted as possible. In accordance with the present invention, there is essentially nothing in the 2K×8 array of memory below of the file allocation table area 32 that is specifically allocated, with the exception of the checksum byte.

With reference to the specific architecture of the area code/exchange code table 208, it should be noted that such table is highly useful with the North American telephone dialing area. Such an architecture is especially useful in telephone areas having a high concentration of area codes and exchange codes and where tariffs or regulatory rules place constraints on the placement of telephone calls between such areas. In other words, in such situations the services of certain operator services cannot be invoked or employed when a call in one geographical location is to be routed in a different or unrelated regulatory area. With that in mind, the NPA/NXX table structure subsystem of the invention allows such calls to be completed in accordance with the regulatory measures, all transparent to the user. In addition, such a table structure is highly useful in completing telephone calls when the area codes are eventually expanded to include numbers 200-999. As can be appreciated, there will be identical area codes and central office exchange codes, at least according to the United States telephone numbering plan.

FIG. 7 is a drawing illustrating a simplified area code/exchange code table. In the preferred form of the invention, ten such tables are utilized, while others may be suitable for other situations. Table 0, termed a "global" table, is different from tables 1-N, the latter tables being similarly structured. Table 0 has a null header which is binary 000, with entries 200-999 representing area codes. In contrast, tables 1-N all have area code headers, such as shown by examples 214, 817 and 713, and all with entries of central office exchange numbers 200-999 associated therewith. As can be seen, the area codes listed in tables 1-N have specific exchange codes associated therewith, thereby facilitating the treatment of telephone calls having identical area codes and exchange codes. The asterisks shown in the tables of FIG. 7 signify a different binary digital state associated with the exchange code, as compared to the non-asterisk numbers. As can be appreciated, each table comprises 100 bytes, e.g., 800 bits so that each bit can define one of two possible routings. Each bit in NPA/NXX table 0 entry defines an area code from 200-999. For each Table 1-9, each bit of the 800 bits defines an exchange code from 200-999. However, it is possible to have area code 214 represent a header to more than one table, thereby defining additional routes of the telephone call.

FIG. 7b illustrates an actual binary designation in the memory which is accessed in connection with Table 1 of FIG. 7a. As can be seen, there area 800 bits associated with the 214 area code, each bit having a binary state of 0, or a binary state of 1. Such state defines one or the other of a routing to be taken by the processor 200. It can be realized that the binary state corresponding to the exchange codes in FIG. 7b are in direct correspondence to the asterisk or non-asterisk entries shown in Table 1 of FIG. 7a. In accessing Table 1 of the NPA/NXX structure, and to determine the routing of an area code 214 and exchange 202, the processor would access the appropriate byte of memory in the general usage area 34 corresponding to Table 1, and offset into such table three bits to determine the binary state thereof, and thus the routing.

As noted above, the NPA/NXX table subsystem 208 occupies a contiguous area of memory, pointed to by the address of file allocation table entry 29. The specific format of the NPA/NXX table 208 includes one byte indicating the offset from this location to the free memory area succeeding the NPA/NXX descriptors. Since each descriptor of the NPA/NXX table occupies five bytes of memory area, the first byte of the format is initialized at the value of six.

The NPA/NXX descriptors themselves include a format which is shown in FIG. 8. The first two bytes 250 of the descriptor include digital information indicating the area code associated with the particular table. This field is formatted as right justified binary coded decimal information. As noted above, when the table accessed is the global table, the associated descriptor is initialized to "000". The next byte 252 of the descriptor comprises the file allocation table (FAT) entry, the address of which points to the actual 100 bytes (800 bits) of data associated with the header. The next byte 254 of data of the descriptor defines the file allocation table entry address which points to the output dialing pattern table which should be taken, if the NPA/NXX match is not found in the table. The next byte 256 of data defines the file allocation table entry which points to a two-byte data area which holds the count of the number of "misses" occurring in accessing the particular NPA/NXX table. Next, a succeeding byte 258 of data of the descriptor includes the file allocation table entry which points to the output dialing pattern which should be taken, if the NPA/NXX is found in the table. The last byte 260 in the descriptor defines a file allocation table entry which points to a two-byte data area of the memory holding the current tabulation of the number of "hits" into the table. As will be described in detail below, the NPA/NXX tables are searched with those having area code headers first, and the global table being searched last.

Having set forth the general structure of the memory, an exemplary telephone call is described below, in which the various tables are utilized in routing the call. According to the example, a local telephone number, such as 555-1234, is input by the user, via the touchtone key pad 23. The number is analyzed by the program controlled processor 200 and converted to binary digital format. In response to the input of digit information, the processor 200 consults file allocation table entry 41 which, in turn, points to the input dialing pattern table 204. While the general structure of an input dialing pattern file is illustrated in FIG. 5, an exemplary sequence of files is shown in FIG. 9. The table is traversed from the top down, comparing the first part of each file with the dialed digits.

As used herein in connection with the input dialing pattern table, a numerical two digit number indicates bounds within which a dialed digit must be in order to be matched. For example, the digit "00" means that the corresponding dial digit must be exact a 0. The digits "29" will provide an affirmative comparison of any dialed digit in the range of 2-9. The digit pairs in the dialing pattern table consist of two BCD digits, and each pair comprises one byte. The digits 0-9 are directly represented, while the digit pair "0F would match any number. The special digit pair "C" followed by any digit in the range of 1 through 9 indicates that that number of optional digits may be dialed. The special digit pair "D" followed by any digit in the range 1-9 indicates that that number of digits must be dialed to terminate the entry. The digit pair "BB" is the number to be dialed on detecting a splashback from the operator service provider. Lastly, the digit "A" followed by any digit in the range of 0-F, indicates that the specified number of seconds must elapse before the input dialing pattern will be executed. If another digit is received before the timeout has expired, the dialing pattern containing this code will not be executed, and the control will be passed to the next pattern. This code may be used in areas in which both 0 plus 10 and 0 plus 7 digit dialing is valid, and 0 plus 7 digit dialing can be determined only by timeout after the digit.

With the foregoing in mind, and with reference again to FIG. 9, the dialed digit 555-1234 is compared with the first input dialing pattern 00 A3. Since the first digit dialed "7" does not fall within the bounds identically equal to "00", an affirmative comparison is not found. Also, since the first two digits dialed were not 00, as noted in the second input dialing pattern file, again no match will be found. In traversing the dialing pattern table downwardly, the third pattern file will not match since the first two digits dialed were not 0 and 1 respectively. The fourth dialing pattern file is also not matched since the second digit dialed is not a 1, even though the first digit, i.e., 7, falls between the range 2 through 9. The fifth dialing pattern file is again not matched since the first digit 7 dialed does not fall within the range 0-1, even though the second digit 4 does fall within the range 2-9.

In comparing the dialed digit sequence with the sixth input dialing pattern file, a match is found. The first digit dialed 7 does fall within the range 2-9, and the designation D6 indicates that a match is found if any 6 digits follow the dialing of the first digit. On finding a match with dialing pattern file 06, the processor 200 proceeds to the file allocation table entry in input dialing pattern file 06. The processor 200 then proceeds in accessing another file allocation table entry pointer in the string of the input dialing pattern entry 06 to carry out the output dialing sequence. Essentially, the processor 200 proceeds to the file allocation table entry associated with dialing pattern sequence 06 to find in the memory 30 the dialing pairs, whereupon such pairs are loaded in the microprocessor register, comprising an output dialing buffer. The digits loaded in the output dialing buffer are analyzed to determine the composition of the digits. The algorithm employed for outpulsing digits is generally that if the digits comprise anything except an asterisk, such digits are to be dialed. If, on the other hand, an asterisk is involved, then the next digit should be interpreted as a special instruction, which, for example, can be a wait for dial tone, progress tone, for a predetermined period of time, etc. In the present example, a code in the output dialing pattern "00" will be encountered, in which event the dialed digits input by the user will be directly output to the local central office. In this manner, a local call is completed. Other telephone numbers, or series of telephone numbers, can be blocked when the entry in the output dialing pattern is designated as "FF." If the designation "FE" is found in the output dialing pattern, then the processor proceeds to the NPA/NXX table. Also, if any other designation is found in the output dialing pattern, such as "33" then the processor will proceed to the memory location associated therewith to dial the digits stored therein. In this manner, desired input digit strings can be translated and dialed as other output digit strings.

In another example, it is assumed that the telephone user keys in the number 1 214 555 1234. This number represents a long distance telephone call to area code 214, and to central office exchange 555. The processor 200 consults the input dialing pattern table 204, via FAT pointer 41, where it finds a match with sequence 08. Assume further than the routing byte associated with input dialing pattern 08 is programmed with "FE", meaning that processor 200 must access the NPA/NXX table subsystem 208. The input dialing pattern sequence 08 would also be programmed to determine where the area code starts in the dialing sequence, where the central office exchange code starts in the dialing sequence, where the four digit number starts, and the length of the number to be returned under the output dialing pattern code *6 by the command to return the user number. In the present example, the NPA starts in position 2 and is three digits long. The NXX number starts at position 5 and is also three digits long. The user number starts at position 2 and is 10 digits long. All this information is contained in the input dialing pattern file 08.

When the input dialing pattern file refers the processor 200 to the NPA/NXX tables 208, the headers of tables 1-N are first consulted to determine a match. When a match is found with the header (area code) the processor will offset into the table a number of memory locations corresponding to the exchange code. In the present example, under the header corresponding to area code 214, the processor will read the 555th memory location to determine if a binary 1 or 0 is stored therein. If a 1 is stored therein, reference is made to a particular file allocation entry, while if a 0 is stored, a different file allocation table entry is consulted. As described above in connection with the NPA/NXX descriptors, certain fields define the file allocation table entries for memory accessing depending on the binary state stored in the NPA/NXX table 208. In any event, the file allocation table entry accessed will in turn point to the output dialing pattern stream of digits, which may be, for example, 1 800 555 1234 *7 *0 *3 *6 *8, which is a typical entry. The processor then carries out the operations in connection with the output dialing pattern which is the dialing of the digits 1 800 555 1234, after which the dialing is switched to DTMF (*7), the processor waits for precision dial tone (*0). the telephone set then outpulses the stored ANI number (*3), whereupon the ten-digit user number is dialed (*6). Lastly, the telephone set cuts through for key pad usage (*8).

In practice, the accessing of the NPA/NXX table 208 is carried out in the following manner. The last two digits of the exchange code are analyzed and defined as a two-digit decimal number. Then, the processor 200 offsets into the table 208 associated with the area code that number of bytes. For example, with an exchange code of 214, the processor would offset into the NPA/NXX table 14 bytes. Then, the processor 200 analyzes the first digit of the exchange code, and subtracts 2 to define a digital number. The bit corresponding to that number in the selected byte defines the memory location which is to be analyzed as to what digital state is stored at such location. In the example, a 2 is subtracted from the first dialed digit of the exchange code, i.e., "2", thereby leaving a 0. Hence, the 0th bit of the fourteenth byte associated with the area code defines the particular memory location of interest. The subtraction of 2 arises in that the actual exchange codes are in a range of 200-999, whereas the processor 200 stores the numbers in a 000-799 range. With this technique, 100 bytes of data can be stored to encode the entire possible range of central office codes employable in the future.

FIG. 10 illustrates a simplified traversal of the memory 30 according to the foregoing example. Briefly, the processor 200 receives dialed digits, and after accessing file allocation table entry 41, proceeds to the input dialing pattern table 204 where a match is found in file 08. A field associated with file 08 specifies file allocation table 29 which specifies the accessing of the NPA/NXX table 208. Assuming the digit stored in connection with the matched area code and exchange number is binary 1, and that the file allocation table entry 90 is associated with such 1, the processor 200 proceeds to entry 90 in file allocation table 32. In turn, the processor 200 reads the address associated with FAT entry 90 and proceeds thereto to find the output dialing pattern noted above. The digits are thus output, and in the sequence specified by the output dialing pattern noted above.

With regard to the memory structure described above, it can be seen that the memory 30 is initially downloaded via the modem 28 with unformatted blocks of data. Since the data stored in the memory is generally contiguous, the addressing of certain registers for storing predefined data is unnecessary. Rather, 16-byte blocks of data can be uploaded or downloaded by the user of the telephone, the owner of the telephone, or an operator service. However, it is the responsibility of the remote programming equipment to read the file allocation tables and make the decisions regarding what other blocks should be read, and when uploading, what blocks should be written.

Programming Security

In accessing the memory 30 of the telephone set 10 by local or remote programming equipment, a security provision is employed to assure that only certain authorized persons can gain such access. In accordance with an important feature of the invention, three remote programming passwords are programmed in the memory 30, and accessible via file allocation table entry 2. The security passwords are of three types. First, a password is utilized by an individual owner of the telephone set of the invention for programming it. Secondly, a password is employed by the agency selling the telephone set to the owner. Lastly, a password is programmable into the telephone set 10 to allow access by the operator service provider, to which the telephone will be subscribed. In providing three separate passwords, three separate versions of remote programming software are made available to each of the groups of persons. Additionally, each copy of the software includes a unique identification associated with it. Thus, no two users will have the same embedded password in their software.

Each of the three noted passwords can be in one of three different states. The password can be unused, or "virgin." The password may also be used, and may be blocked. In the event a password for a particular class of user is virgin, than any password will be accepted for entry into the telephone set 10. On the other hand, if a password for a particular class of user is blocked, then no password exists which will permit access to the telephone set 10. If the password is used, then only that password will permit access to that user level.

In view that telephones are becoming more specialized and that a number of different types and levels of telephone services are now available, security is necessary to limit access to various internal parts of the telephone sets. For example, the revenue made by many telephone sets is chargeable to its identification number, such as an ANI. Hence, it is of primary importance to limit access to one's telephone so that another person does not program his or her ANI number therein and receive the economic benefits. In addition, privately owned telephones which are usable by the public share the same problem. Also, in view that many operator service providers are in existence today and have programming capabilities, it becomes a concern to limit access to those services having a need to program the telephones. In like manner, a number of distributors of telephone sets have programming capabilities, and thus there is a need for security measures at that level.

In accordance with an important feature of the invention, a three level security system is provided as well as a technique for linking the password with the ability to use the password. In accordance with the invention, each copy of software is initialized at the manufacturer with a unique password and a unique software identification. So, for example, software issued to an owner level is designated as such, and is also identified with a unique password. The password is a 32-bit word which yields over four billion possible combinations. software issued to an owner level is designated "OWN", while software issued to a distributor level entity is identified as "DIS", and software issued to an operator service provider is designated "OSP." File allocation table entry 2 provides the address for accessing the memory are storing the version letter of the software. Thus, stored in the memory 30 of the telephone set 10 is a location for storing a password associated with an owner, a password associated with a distributor, a password associated with the OSP, and software identifications associated with each such level. The password structures are shown in FIG. 11. An access of the memory 30 of the telephone set 10, via the software of a remote programmer, makes available to the processor 200 the type of software and password. The processor 200 of the telephone set 10 then accesses the appropriate memory area, via the file allocation table entry 2, to retrieve the appropriate password and software identification and find a match with that received during the transmission. If a match is found, access is allowed for programming purposes. If a match is not found, access is denied, even if the passwords matches a version of another level of software.

As an example, if a remote call is received by the telephone set 10, and identified as OSP software and an associated password, and if the telephone set processor finds the OSP type of software, but with a distributor password, access will be denied.

On delivery of a telephone set of the invention from the factory, each password is programmed as 0 into the memory areas. If the telephone set is sold to an individual, that individual can program the register to a unique number to define a personal password. Also, the individual can remove the virgin status of the OSP and DIS security levels by programming a block code therein, so that his telephone set cannot be accessed by distributors or operator service providers. The processor 200 recognizes a blocked password when it contains a sequence of 32 digital 1's in the password location. In addition, the processor is programmed to prevent the owner from blocking his own level of access. Otherwise, then he would not be able to program his own telephone set. Similarly, an individual owner cannot program the telephone set password area of a DIS level or OSP level with his own password. However, in the event the individual also qualifies as a distributor or an OSP, then those versions of software are obtainable, in which event the registers can be programmed accordingly. In addition, an individual owner can program his security level for a virgin status, should he desire to sell the telephone set to another person who desires another security code.

In the event an individual owner of a telephone set of the invention has no programming facilities, the telephone set can be programmed by the OSP facilities, using the OSP level and password. If the owner eventually obtains a software copy of the OWN version, the OSP can program its password level to be blocked, and unblock the owner's level. The owner can then enter his password and program the telephone accordingly. The processor 200 is also programmed to allow certain fields of the memory 30 to be programmed via key pad access, while denying programmability to other fields. For example, a person having the appropriate password can key the same in via the key pad 23 and gain access to various flags and speed dial numbers, but cannot gain access to input dialing pattern tables, the NPA/NXX tables or output dialing pattern tables. Such tables can only be programmed remotely, via the modem 28, and by using the proper software levels and associated passwords.

Many key pad sequences are available for initiating local programming. For example, by keying in an "**" and the password, and a certain digit sequence, one can enter the programming mode. Local programming techniques are described in more detail in U.S. Patent Application entitled "Personalized Telephone for Automatic Access to Operator Services" filed Mar. 7, 1988, Ser. No. 164,505 assigned to the assignee hereof.

From the foregoing, described is a telephone set having a processor control powered by a ringing current, during telephone ringing cycles. The telephone set also incorporates a memory structure that provides a high degree of flexibility for programming and routing telephone calls. Enhanced security provision have been disclosed for use in maintaining a high degree of security to the telephone, in view of the highly competitive nature of the telephone apparatus an services available.

Although the preferred embodiment of the invention has been described in detail, it should be understood that various changes, substitutions and alterations can be made therein without departing from the spirit and scope of the invention as defined by the appended claims.

What is claimed is:

1. A method for supplying power to a microprocessor in telephone apparatus receiving electrical signals from a telephone line, comprising the steps of:

converting periodically occurring signals received by said telephone apparatus over the telephone line into a DC voltage;

coupling said DC voltage to the microprocessor for at least allowing the microprocessor to remain for a period of time in a static electrical state;

powering said microprocessor during an on-hook condition using said periodically occurring signals, providing an off-hook condition to the telephone line while a handset is yet on-hook; and powering said microprocessor during an off-hook condition by switching a telephone line loop current to said microprocessor.

2. The method of claim 1, further including storing the DC voltage between cycles of the periodic signals so that said microprocessor receives a DC voltage over a period of said signals.

3. The method of claim 2, further including converting ringing signals to the DC voltage.

4. The method of claim 1, further including storing the DC voltage on a capacitor so that a DC voltage can be supplied to the microprocessor during inactive times of said periodic signals.

5. The method of claim 1, further including sensing on-hook and off-hook conditions of a cradle switch of the telephone apparatus.

6. The method of claim 1, further including rectifying the periodically occurring signals to generate a DC voltage for powering said microprocessor.

7. The method of claim 1, further including interrupting the microprocessor during each cycle of the periodically occurring signals and allowing the microprocessor to process programmed instructions.

8. The method of claim 7, further including processing instructions which are adapted for counting the number of intervals of the periodically occurring signals.

9. The method of claim 8, further including receiving data over the telephone line after the occurrence of a predefined number of said intervals, for programming said telephone apparatus.

10. The method of claim 9, further including remotely programming said telephone apparatus.

11. The method of claim 10, further including receiving programming data by said microprocessor after a user password and a software password have been matched with corresponding passwords stored in a memory associated with said microprocessor.

12. A method for supplying power to a microprocessor in telephone apparatus receiving electrical signals from a telephone line, comprising the steps of:
converting periodically occurring signals received by said telephone apparatus over the telephone line into a DC voltage;
coupling said DC voltage to the microprocessor for at least allowing the microprocessor to remain for a period of time in a static electrical state; and
powering said microprocessor during active times of the periodic signals so that instructions can be executed for counting the number of active periods.

13. The method of claim 12, further including simulating an off-hook condition when a predefined number of counts has been counted.

14. The method of claim 13, further including powering said microprocessor with a voltage generated by a telephone line loop current after said predefined number of counts has occurred.

15. The method of claim 14, further including simulating an off-hook condition to initiate said loop current.

16. The method of claim 15, further including bridging a hook switch of the telephone apparatus with a shunt circuit to simulate the off-hook condition.

17. A method for supplying power to a microprocessor in telephone apparatus receiving electrical signals from a telephone line, comprising the steps of:
converting periodically occurring signals received by said telephone apparatus over the telephone line into a DC voltage;
coupling said DC voltage to the microprocessor for at least allowing the microprocessor to remain for a period of time in a static electrical state; and
interrupting said microprocessor on the occurrence of said periodically occurring signals for processing instructions.

18. A method for powering a telephone set connected to a telephone line, comprising the steps of:
receiving ringing signals over the telephone line;
converting the ringing signals to a voltage for powering a microprocessor in the telephone set during periods of ringing;
activating the microprocessor during the ringing periods for executing instructions for counting the number of rings;
providing an off-hook condition of the telephone set in response to a predefined number of ringing cycles so that loop current flows in the telephone line; and
converting the telephone line loop current to a voltage for powering the microprocessor during the off-hook condition.

19. The method of claim 18, further including simulating the off-hook condition while a handset of the telephone is yet in an on-hook condition.

20. The method of claim 19, further including receiving programming data from the telephone line during the simulated off-hook condition for programming the telephone set.

21. The method of claim 18, further including selecting between a ground start circuit and a loop start circuit to activate the telephone line for receiving data over the telephone line.

22. The method of claim 18, further including routing a loop current generated voltage and a ring current generated voltage in parallel to the microprocessor.

23. A telephone set powered by a telephone line connected thereto, comprising:
a programmable microprocessor having a low power mode and a running mode, and having a sleep mode for maintaining status information therein during the low power mode;
a first circuit receiving periodic signals from the telephone line and converting the signals into a DC power for powering the microprocessor during on-hook conditions of the telephone set;
said microprocessor being in the sleep mode during inactive intervals of the periodic signals and in the running mode during active intervals of the periodic signals; and
a second circuit for powering the microprocessor with a voltage generated by a telephone line loop current during off-hook conditions.

24. The telephone set of claim 23, wherein said first circuit comprises a rectifier for rectifying ringing signals and supplying DC power to the microprocessor.

25. The telephone set of claim 23, wherein said microprocessor counts each active interval as a single event, and on the occurrence of a predetermined number of events said microprocessor causes the telephone to automatically go into an off-hook condition.

26. The telephone set of claim 25, wherein said number of said events is programmable.

27. A telephone set powered by a telephone line connected thereto, comprising:
a programmable microprocessor having a low power mode and a running mode, and having a sleep mode for maintaining status information therein during the low power mode;
a first circuit receiving periodic signals from the telephone line and converting the signals into a DC power for powering the microprocessor during on-hook conditions of the telephone set;

a second circuit for powering the microprocessor with a voltage generated by telephone line loop current during off-hook conditions; and means for coupling an indication of the occurrence of the periodic signals to an interrupt input of the microprocessor so that said microprocessor can execute instructions during active periods of the periodic signals.

28. The telephone set of claim 27, wherein said microprocessor executes instructions for counting the number of occurrences of the periodically occurring signals received on the telephone line.

29. The telephone set of claim 28, further including a hook switch simulation circuit for simulating an off-hook condition on the occurrence of a predetermined number of periodically occurring signals.

30. The telephone set of claim 29, further including a circuit for generating a microprocessor supply voltage from DC loop current during simulation of the off-hook condition.

31. A telephone set powered by a telephone line connected thereto, comprising:
- a microprocessor having a low power mode and a running mode, and having a sleep mode for maintaining static state conditions therein during the low power mode;
- a circuit for converting periodic signals received over the telephone line into a DC voltage supplied to the microprocessor;
- a circuit for converting a loop current of the telephone line to a supply voltage supplied to said microprocessor;
- a circuit for receiving said periodic signals and providing an interrupt signal to the microprocessor; and
- said microprocessor being programmed in response to an interrupt thereto for incrementing a counter and comparing a resultant count with a predefined number, and on a negative comparison said microprocessor returns to the sleep mode, and on an affirmative comparison said microprocessor places the telephone set in an off-hook condition.

32. The telephone set of claim 31, wherein said microprocessor includes a standby power input which receives power of about 3 volts, and a power supply input which receives power of nominally about 5 volts.

33. The telephone set of claim 31, further including a telephone interface circuit for receiving telephone line signals, and said interface circuit is adapted for converting loop currents to a supply voltage coupled to said power supply input of the microprocessor.

34. The telephone set of claim 33, further including a circuit for connecting the periodic signals to the interface circuit for generating microprocessor interrupt signals in response thereto.

35. The telephone set of claim 34, further including a memory associated with said microprocessor, and further including a program stored in said memory for counting the occurrences of periodic signals.

36. A method for supplying power to a telephone set for remote programming thereof, comprising the steps of:
- receiving over a telephone line connected to the telephone set a plurality of ringing signals;
- providing power to a processor in the telephone set during ringing by converting the ringing signals to a DC voltage, and coupling the voltage to the processor during said ringing;
- processing software instructions during the ringing to count a number of ringing cycles;
- placing the telephone set off hook after a predefined number of ringing cycles so that the processor can than be powered by telephone line loop current; and
- receiving data over the telephone line by said processor for programming a memory.

37. The method of claim 36, further including placing the processor in a low power mode between ringing cycles.

38. The method of claim 36, further including placing the processor in a sleep mode during a four second silent interval between ringing cycles.

39. The method of claim 36, further including carrying out said programming while a cradle hook switch is on hook, but line current is flowing into the telephone set.

* * * * *